Nov. 25, 1952 J. W. McCUTCHEON 2,619,402

AUTOMATICALLY RECORDING THE SPEED AND IDENTITY OF VEHICLES

Filed Oct. 3, 1945 4 Sheets-Sheet 1

INVENTOR
JOHN W. McCUTCHEON
BY Ely & Pattison
ATTORNEYS

AUTOMATICALLY RECORDING THE SPEED AND IDENTITY OF VEHICLES

Filed Oct. 3, 1945

INVENTOR
JOHN W. McCUTCHEON
BY Ely & Pattison
ATTORNEYS

AUTOMATICALLY RECORDING THE SPEED AND IDENTITY OF VEHICLES

Filed Oct. 3, 1945 4 Sheets-Sheet 3

INVENTOR
JOHN W. McCUTCHEON
BY Ely & Pattison
ATTORNEYS

Nov. 25, 1952 J. W. McCUTCHEON 2,619,402

AUTOMATICALLY RECORDING THE SPEED AND IDENTITY OF VEHICLES

Filed Oct. 3, 1945 4 Sheets-Sheet 4

INVENTOR
JOHN W. McCUTCHEON
BY
Ely & Pattison
ATTORNEYS

Patented Nov. 25, 1952

2,619,402

UNITED STATES PATENT OFFICE 2,619,402

AUTOMATICALLY RECORDING THE SPEED AND IDENTITY OF VEHICLES

John W. McCutcheon, New York, N. Y.

Application October 3, 1945, Serial No. 620,058

15 Claims. (Cl. 346—107)

My invention relates to a method and apparatus for determining and indicating the speed of a moving object and for making a permanent record of the same for use as evidence in a court of law or for any other purpose.

This invention is of particular use in recording events in the operation of automobiles, trucks, motorcycles and other vehicles upon a highway, although it is by no means limited to such use.

It is well known that reckless driving at unsafe speeds constitutes a major hazard of road driving. It is also well known that safe driving speeds vary greatly from place to place and depend on the condition of the road surface, traffic congestion, road contour, visibility and such like. It is one purpose of my invention to provide the police or other law enforcing officer with a portable apparatus, which may be set up at convenient locations along a highway and which may be readily adjusted to various speed settings, so that if a vehicle passes the test points at a greater, or in certain cases a less, speed than that for which the device is set, it will automatically record a picture of the vehicle or object so moving, together with identifying license plates, and at the same time record the speed, the time, and the location of the instrument on the same section of a film.

Another object of my invention is to assist traffic officers in more completely covering their territory and by assisting them with court evidence obtained by projecting the picture so taken on a viewing screen.

Another object of my invention is to discourage reckless driving by advertising in advance the presence of such a speed trap or series of traps.

A further object of my invention is to record such speed with identifying picture at a low cost and with simplicity of control, so that the equipment could be widely used by relatively untrained personnel.

My invention consists essentially of a novel combination of camera and timing device integrated into a single working unit, through the use of a series of optical, electrical and mechanical devices herein described and particularly pointed out in the claims.

The following description is made to instruct one skilled in the art of how to make and use one or more forms of the invention; but it is to be understood that the description and illustrations are not to be interpreted as limiting the scope of the invention in any manner whatsoever except as limited by the appended claims.

Other novel features of the invention will become apparent as the following specification is read in conjunction with the accompanying drawings, in which, Figure 1 is a diagrammatic plan view illustrating the apparatus in position of use upon a two lane highway.

Figures 14, 14A:
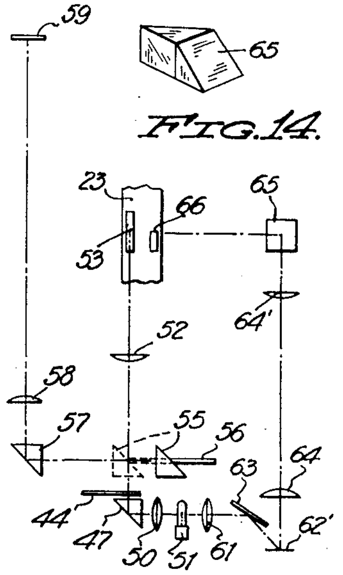
Figure 14 is a composite diagrammatic view of all the optical image pick-up and transmitting means.

Figure 14*a* is a detail perspective view of the combination prism.

Figure 15:
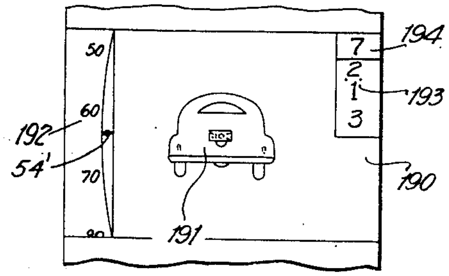

Figure 15 is a face elevational view of a fragmentary portion of the film containing a photographic exposure produced by the apparatus.

Figure 16:
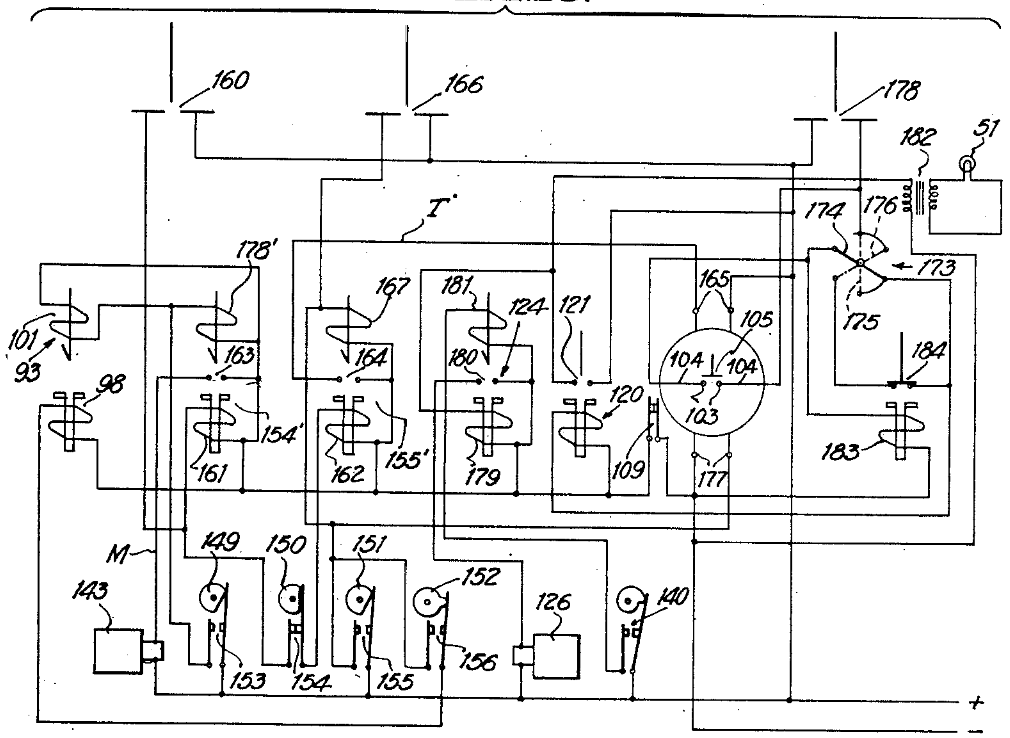

Figure 16 is an electrical diagrammatic view of the electrical circuits employed in the apparatus.

Referring to the drawings wherein like characters of reference indicate corresponding parts throughout the several views thereof, A designates a combined camera and timing unit of the roadside type. The unit A includes a rectangular shaped housing 10 which in actual practice may be approximately one foot by one and one-half by three feet and is adjustably supported upon a pedestal base 11 by a conventional universal joint 12.

The housing 10 is divided by two suitably spaced horizontal partitions 14 and 15 into an upper compartment 16, an intermediate compartment 17, and a lower compartment 18. The upper compartment houses the timing and recording mechanism and such relays, motors, switches and other parts essential to the mechanical operation of the unit. Access to the compartment 16 is by way of a removable panel 19 which closes the side thereof. The intermediate compartment 17 houses the remaining electrical control equipment and access thereto is by way of a removable side panel 20. The lower compartment may also be reached through the removal of panel 20 and houses supplemental power sources. inverters, transformers and other heavy parts. While removable panels have been shown for permitting access to the several compartments, it will be understood that locked panel doors may be provided for preventing unauthorized persons from tampering with the vital control and operating parts of the unit.

A photographic lens 21 is mounted in the front wall of the upper compartment 16. Light through the lens 21 is controlled by a shutter 22. A light shield 23' is attached to the front of the housing to shield the lens 21. The lens 21 and shutter 22 function in camera fashion to take a picture upon a strip of sensitized photographic film 23. The film 23 is of the well known roll type such as is used in a moving picture camera and is capable of taking many pictures by means of a single loading. The film 23 is normally wound on a spool 24 rotatably mounted upon a spindle 25 and has its free end portion passing over a pair of sprockets 26 and 27, past the film gate 28, thence through a slit 29 in the front wall of a removable light-proof film-receiving box 30. The novel features of the film-receiving box 30 are set forth in a separate application, Patent No. 2,409,948, issued October 22, 1946. A spring 31 frictionally bears upon the spindle 25 to prevent free paying out of the film 23 from its spool 24. The sprocket 26 is an idler while sprocket 27 is driven in counterclockwise or forward film-feeding direction by a motor 126 through a gearing presently described. The driven sprocket 27 is fixedly mounted on a spindle 32 which is prevented from back-slipping by ratchet means 33, the pawl of which is pivoted to a vertical bearing plate 34 which extends forwardly from the rear wall 35 of the housing 10. Also fixed to the spindle 32 is a driven gear 36. The spindle 32 is automatically driven in a manner to be presently explained, and may be hand turned by means of a crank 37 which is connected to the spindle through a normally disengaged clutch 38. By pushing the crank handle 37 inwardly, the clutch will be engaged and the spindle 32 turned to manually unwind the film from the spool 24 into the box 30, when desired. To complete the camera mechanism, the upper corner of the housing 10 is provided with a standard view finder 39 for use adjustably positioning the unit A relative to the area of the road to be photographed during actuation of the camera mechanism.

Also mounted within the compartment 16 below the camera structure heretofore described, is a timing device 40 which may be of any standard equipment employed for measuring fractions of a second depending upon the principle of a synchronous motor arranged for operation off a 110 volt electric current, or on a charging and discharging condenser through a suitable electronic circuit, or on an amount of current flowing through a milli-second meter, or on a purely mechanical device. For purposes of illustration a synchronous clock timer is used here. The synchronous motor 41 (Figure 9) is enclosed in the hollow base 42 of the device 40 and rising therefrom is a shaft 43 driven thereby. A cover 42' seats upon the base 42 and encloses the shaft 43 and other mechanism about to be described. A speedometer member or dial 44 is fixedly carried by the upper end of the shaft 43 and has a marginal scale 45 provided on a transparent peripheral area 46. The scale 45 is graduated to indicate the speed in miles per hour for the distance between the trip cables 160—186 and 166—187, Fig. 1. The scale figures are suitably inverted as illustrated in 46, Fig. 8, to render them readable when the picture in the developed film 23 is projected on a screen as shown in 192, Fig. 15. The method of transferring the image of scale 45 to film 23 is to be described presently.

The relation between scale markings and miles per hour speed of a vehicle is established mathematically from the distance between the trip cables 160—186 and 166—187 and the speed of rotation of dial 44. For example, when the trip cables are ten feet apart and the timing shaft 43 and dial 44 make one revolution in 0.360 second, then a vehicle at a speed of sixty miles per hour would require an interval of ten eighty-eighths seconds to traverse the measured distance. In terms of dial revolution this calculates to 114/360 or to 114° in terms of total angle through which the dial turns. At a vehicle speed of fifty miles per hour, it may similarly be calculated that the dial will turn through a total angle of approximately one hundred and thirty-six degrees.

Figure 13:
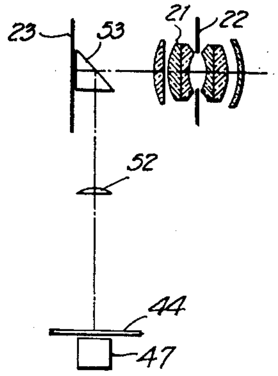
Figure 13 is a diagrammatic view of the optical means for transmitting an image of the speed indicating dial upon film strip.

Mounted on the cover 42' directly beneath the transparent area 46 of the dial 44 is a right angle prism 47, one right angle side being face up and the other in alinement with an opening 48 in the side wall of the base 42. The top wall of the cover 42' in alinement with the prism 47 is provided with an opening 49 through which an image of the miles per hour scale 45 is transmitted upwardly to the sensitized film. Mounted adjacent and exteriorly of the cover and in alinement with the opening 48 is a lens 50 through which light from a small light bulb 51 passes. The lens 50 renders light rays from the bulb 51 parallel from where they pass to the prism 47, upwardly through the transparent edge of the dial 44, through opening 49 and a lens 52 (also Figures 13, 14). The lens 52 is so positioned and has such focal length that the image of the scale 45 is focused on the film after passage through the right angle prism 53 to the film 23. By reference to Figure 15 it will be noted that only the margin at one side of the exposed film is covered by the scale image. All optical parts are suitably mounted and protected against stray light in accordance with conventional practice. Light ducts 44*a* and 44*b* convey the image of the dial 44 to the camera and to an observation point respectively, and light duct 193*a* conveys the image of clock 193, and identification number 194 hereinafter described, to the camera.

A reticle 54 is mounted in the opening 49 (Figure 9), the same having a reference 54' line to appear in the image (Figure 15) of the miles per hour recorded on the finished picture.

In order that the image projected by the prism 47 may be viewed by an operator, I provide a right angle prism 55 mounted on a slide rod 56 which may be manually pushed by button 56' and held to cause the prism 55 to assume a position above and in vertical alinement with prism 47 as indicated in dotted lines in Figure 14. Therefore the parallel beam of light passing upwardly through the scale 45 is diverted at right angle and passes through a fixed prism 57 and lens 58 onto a ground glass screen 59 mounted in the top of the housing 10. The lens 58 is of a focal length and positioned to form the image of the scale on the ground glass screen 59. A spring 60 acts upon the rod 56 to return the prism 55 to normal position release of the push upon button 56', whereby the prism 55 is out of image intercepting relation with respect to the beam projector onto the film through prism 53.

At the same time that the miles per hour scale image is imprinted upon the film 23, a second image showing the time and apparatus identification number is also printed on the margin thereof opposite to that bearing the miles per hour indicia (Figure 15). Light rays from the electric lamp bulb 51 are rendered parallel by their passage through a lens 61, which light rays are reflected downwardly by a mirror 63 onto a combined clock and identification device 62 (Figures 5 and 15) having a dial 62'. A field lens 64 collects the rays for the lens 64' which is of such focal length and positioned as to focus the image of the dial 62' on the film margin after its passage through prisms 65 and 66. Prism 65 may be a combination of two suitably cut and corrected right angle prisms. The optical parts just described are also enclosed in light-proof tube structures but any other form of light-proofing may be resorted to if desired.

Figure 8:
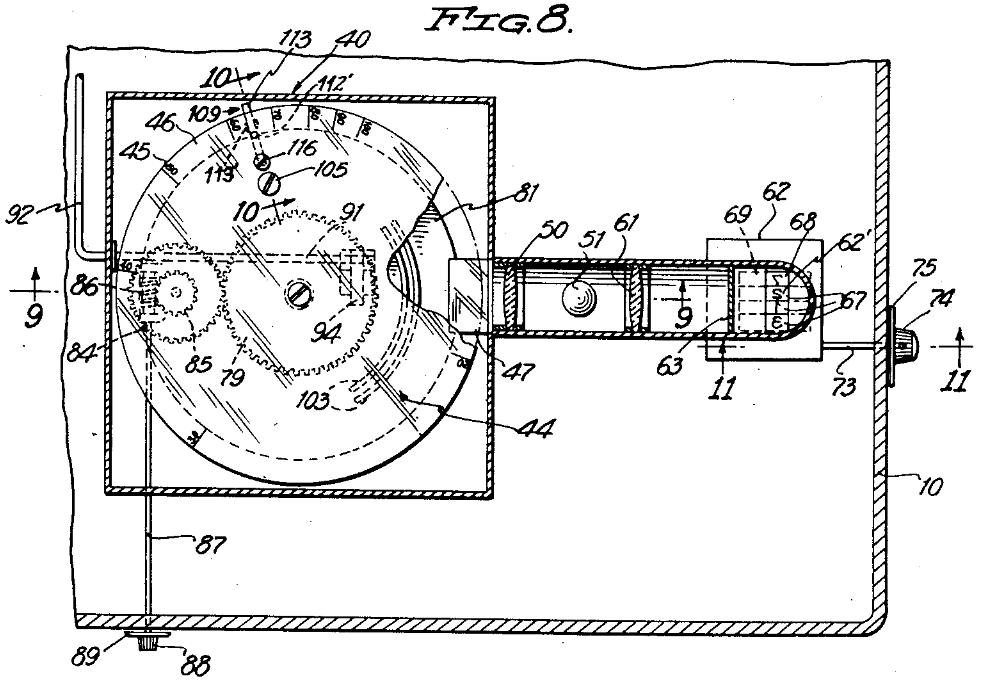
Figure 8 is an enlarged horizontal sectional view on the line 8—8 of Figure 5.
Figure 9:
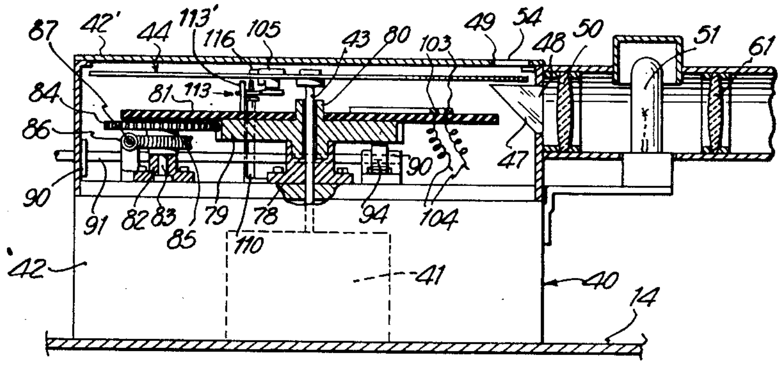
Figure 9 is an enlarged fragmentary vertical sectional view on the line 9—9 of Figure 8.

Figure 8 illustrates the compact time and indicating device 62 which includes a conventional electric synchronous motor with rotatable numeral bearing disks. Any other type of clock may be used, however, such as a conventional synchronous motor with circular dial and hands, or a combination mechanical with electric rewind or other well known type. The time indicia is illustrated by three successive numerals 67, and in the drawing the time indicated thereby is "2:13" meaning the hour, two-thirteen.

Figure 11:
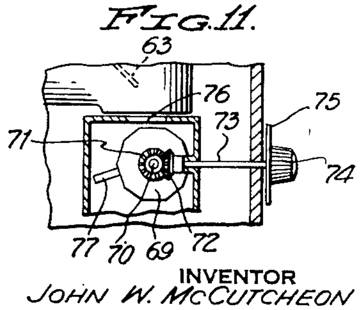
Figure 11 is a detail vertical sectional view on the line 11—11 of Figure 8.
Figure 12:
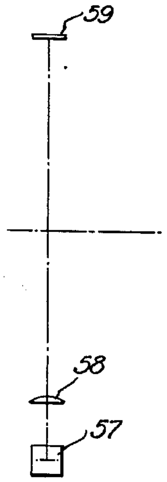
Figure 12 is a diagrammatic view of the optical means for sighting the image from the speed indicating dial.

The identification number 68 appears above the set of time numerals and is important where classification of the resulting pictures is necessary for indexible evidence. The identification number 68 is one of several provided on the flat faces forming the periphery of a driven type dial 69. The dial 69 is rotatably mounted in suitable bearings provided in the housing of the device 62. The driven shaft 70 (Figure 11) has a bevel gear 71 fixed thereto which is in constant mesh with a bevel gear 72 fixed to the inner end of a manually rotatable shaft 73. The shaft 73 extends through the wall of the housing 10 and has a knob 74 fixed thereon. The shaft 73 carries a dial 75 having numbers similar to those on the flat faces of the drum and being in like consecutive arrangement so that a person may set the dial 75 to a certain identification number, and that number 68 will appear in register with the sight opening 76 and in a column with the time numerals 67. In this instance the identification number is "7" and it identifies the particular apparatus from which the photographic picture is taken. The identification numbers may be changed at the will of the authorities by manipulation of the knob 74, and as shown in Figure 11 the drum 69 may be spring tensioned at 77 to maintain the dial in set position against accidental turning movement.

Referring back to the timing device 40 (Figure 9), the top of the base 42 thereof has a pedestal bearing 78 mounted axially with respect to the shaft 43 and through which said shaft passes. The bearing 78 rotatably and slidably supports a ring gear 79 in a horizontal position, said gear having an upstanding hub 80. Slidable vertically upon the hub 80 and keyed thereto for turning therewith is a disk 81 of dielectric material. Also mounted on the top of the base is a second pedestal bearing 82 in which a vertical shaft 83 is mounted, the upper end of which carries a driving gear 84 which is in constant mesh with the gear 79. The gear 84 is relatively thin in comparison to the thickness of the gear 79 to enable the latter gear to slide while in meshing engagement with the driving gear 84. Turning movement is imparted to the driving gear 84 by a gear 85 fixed to the shaft 83 and which is in constant mesh with a worm 86 fixed to the inner end of a manually turnable shaft 87. The shaft 87 extends beyond the side wall of the housing 10 and carries a manipulating knob 88 and a dial 89. By turning the knob 88, motion may be imparted through shaft 87, worm 86, gear 85, shaft 83, and meshing gears 84 and 79 to the disk 81 to turn on its axis in either direction, whereby the disk may be manually set for reasons to be hereafter explained.

The disk 81 is raised and lowered by mechanical means operated by an electric reset latch-in solenoid type relay now to be described. Journalled in bearings 90 within the housing of the timing device 40 and extending horizontally beneath the gear 79 is a rocker shaft 91, one end of which is provided with a right angular extending crank portion 92 (Figure 4) which is disposed exteriorly of the housing and is under actuating influence of an electric reset latch-in solenoid type relay 93 supported upon the horizontal partition 14. The other or inner end of the rocker shaft 91 has a lifting cam 94 fixed thereto, the same underlying the vertically slidable gear 79. The cam 94 is normally held in a lowered position by a spring 95 having one of its ends attached to the crank 92 and its other end secured to a fixed support 96, the latter having a fixed stop pin 97 against which the crank normally abuts to limit its upward movement. The cam 94 is moved to raised position by energizing of a solenoid 98 which has its sliding core 99 pivotally connected to the crank. A relay 100 has a magnet 101 which actuates a latch 102 to releasing position, the latter being engageable with the free end of the crank 92 which latch acts to hold the crank down when moved by the energizing of solenoid 98. Thus by energizing of the magnet 98, the crank 92 is pulled down, causing rocker shaft 91 to turn cam 94 into lifting engagement with the underside of the gear 79, and likewise lifting the disk 81 for reasons presently to be explained. The latch 102 holds the crank down until the relay magnet 101 is energized whereupon the spring 95 returns the rocker shaft and cam 94 to lowered position.

The upper face of the disk 81 carries a pair of parallel arcuate contact members 103—103 concentric to the axis of the disk and suitably insulated apart and arranged in an electric circuit with the relay system illustrated diagrammatically in Figure 16. The contact members 103—103 are connected in the system by short lengths of flexible wires 104 having sufficient slack therein to permit turning of the disk 81 a one-half revolution in each direction. These segmental contact members 103—103 cover only a segment of the whole disk and are so positioned that the contact member 105 (Figures 8 and 10) on the dial 44 will be directly over both contact members 103—103 when the dial is rotated. In other words, the contact member 105 is in the path of the contacts 103—103 when the dial is turned.

Figure 10:
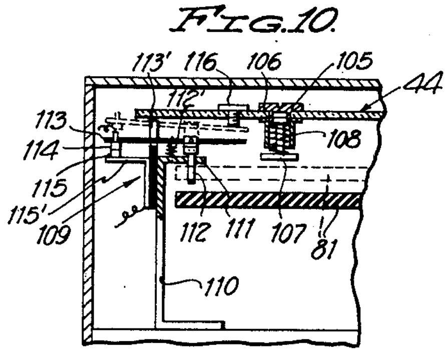
Figure 10 is an enlarged detail vertical sectional view on the line 10—10 of Figure 8.

The contact member 105 is clearly illustrated in Figure 10 and includes a hollow screw 106 having a contact shoe 107 slidably mounted therein and resiliently held in a down position by a spring 108 in the path of the contact members 103—103, when the disk is lifted to raised position. The contact members 103—103 and 105 coact to form a switch for closing electrical circuits hereafter described. The spring 108 acts to reduce shock upon the contact shoe 107 and forcibly acts upon the contact shoe to produce a firm contact between the same and the contact members 103—103 to electrically bridge the same.

Referring to Figure 8 of the drawings, it will be seen that by rotating the disk or element 81 by turning of the knob 88, the same may be set to close a circuit through contact members 103—103 and 105 at predetermined speed of travel of a motor vehicle. By rotating the disk 81 to various positions, the dial contact 105 will or will not make contact with the arcuate contacts or terminals 103—103 carried by disk 81, depending upon the relative position of the dial. The length of the contacts 103 (Figure 8) may be such to be adapted to maintain engagement with contact member 105 for a range of vehicle speed of say sixty miles per hour which ought to take care of all contingencies. Accordingly the disc 81 may be preset as in Figure 8 to produce contact with the moving member 105 at all speeds, for example, in excess of forty miles per hour. For this setting, if the speed is less than the forty miles per hour, the member 105 will not be moved far enough by its disc 81 to engage the contacts 103 when said disc 81 is in its raised position as heretofore described. The timing device 40 may therefore be used to control an electric circuit to be subsequently described according to settings predetermined by manual actuation of the knob 88. Also, various lengths of arcuate contact members 103 may be employed to conform to other desirable relationships.

When the dial 44 is in neutral or zero position and the disk 81 is in its low position, the switch 105 is in radial alinement with a normally closed switch 109 (Figures 8 and 10). The switch 109 includes a support 110 having a horizontal arm 111 overlying the disk 81 and disposed above the level of the raised position of the disk. Slidably mounted on the arm 111 is a vertical pin 112, the lower end of which is in the path of vertical movement of the disk 81. Pivotally carried by the upper end of the pin 112 is an insulator switch arm 113 carrying a contact 114 for engagement with a contact 115 on the fixed support 115'. A light tension coil spring 112' between the arm and the support 111 holds the pin 112 depressed and keeps the contacts engaged with each other. To prevent lateral swinging of the arm 113 and keep the contacts in alinement, a rod 113' on support 110 may suitably engage the arm, as by having a longitudinal slot in which the arm is freely movable up and down. An abutment element 116 on the dial 44 is in position to engage the tail end of the switch arm 113 when the dial is in zero or initial position, if at the same time the disc 81 is raised to upwardly push the pin 112 to lift the arm. Then the latter assumes the dot-dash line position and the switch 114, 115 is open. If the member 116 is in a different position, the spring 112' will keep the switch closed even if the disc 81 is raised to partly lift the arm. But if the dial 44 is at zero position, the projection 116 causes tilting of the upraised arm to open said switch. The switch 109 is so positioned as not to interfere with the free movement of either the dial 44 or disk 81.

The conventional shutter mechanism of the camera unit is designated 117 (Figures 4 and 6) and includes a pivoted shutter actuating arm 118 which, when moved downwardly, effects an actuation of the shutter mechanism to take a picture upon the film strip 23. The sliding core 119 of a solenoid 120 is pivotally connected to the outer free end of the arm 118 so that when the solenoid is energized, the same will move the core downwardly which imparts a downward pull on the arm 118, thus actuating the shutter mechanism. A normally open switch 121 is closed as the core 119 moves downwardly, the same including spring contact 122 and an adjustable contact 123. The contact 122 is in the path of downward movement of the shutter arm 118 and is engaged thereby during its downward movement to cause said contact to engage contact 123 and close the circuit in which switch 121 is arranged. Also embodied in the circuit with the switch 121 through 182 is the electric lamp 51 so that as the shutter is actuated the lamp 51 (Figure 14) flashes light through the scale 46 on dial 44 and onto dial 62'. Also the switch 121 actuates a latch-in relay 124 (Figure 16) which is in the circuit therewith and which relay serves to start motor 126 (Figures 5 and 16) for causing the film strip 23 to move ahead one picture area in a manner presently described.

Figures 4, 5, 6, 7:
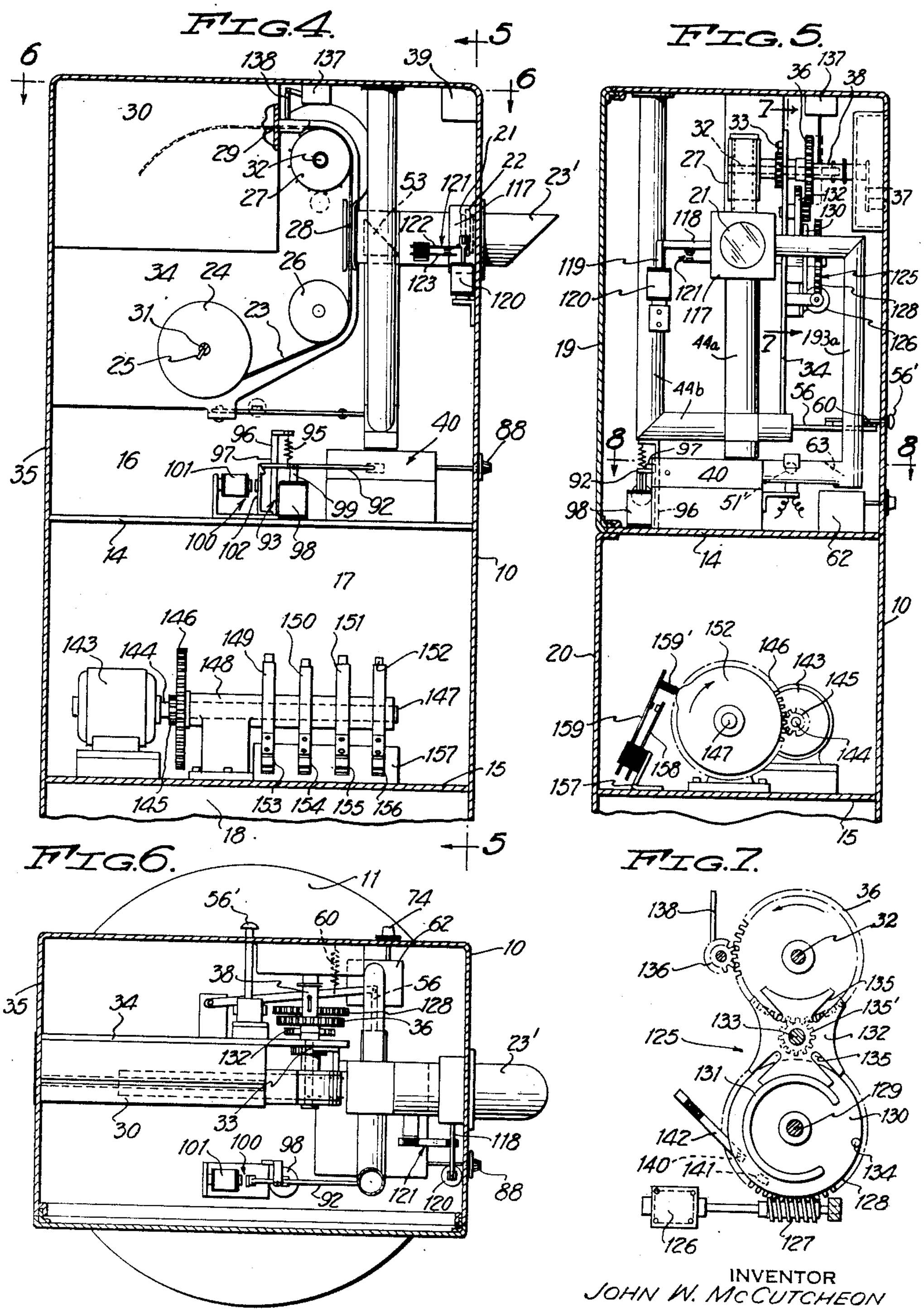
Figure 4 is a vertical longitudinal sectional view through the upper portion of the unit with enclosed parts in elevation.
Figure 5 is a vertical transverse sectional view taken substantially on the line 5—5 of Figure 4.
Figure 6 is a horizontal sectional view taken substantially on the line 6—6 of Figure 4.
Figure 7 is an enlarged detail sectional elevational view of the mechanism for automatically actuating the recording film after each exposure thereof.

The film feeding mechanism is best illustrated in Figures 5 and 7 and includes broadly a Geneva movement 125 for imparting a predetermined rotation to the film feeding shaft 32, the same being driven by an electric motor 126. The motor shaft has a worm 127 which is in constant meshing engagement with a worm gear 128 fixed to a shaft 129. Also fixed to the shaft 129 is a disk 130 having a concentric segment 131 engageable by a Geneva wheel 132 fixed to a shaft 133. The inner face of the disk 130 carries a pin 134 which successively engages radial slots 135 in the Geneva wheel 132. Upon each complete revolution of the shaft 129, a one-quarter revolution is imparted to the shaft 133 through the Geneva wheel 132 and pin 134. Power from the shaft 133 is transmitted to the sprocket shaft 32 by means of a small gear 135' fixed to shaft 133 and which has constant mesh with large gear 36. The gearing is so proportioned that each one-quarter turn of the Geneva wheel 132 will move the film 23 forward one picture area.

The gear 36 has the gear 136 of a counting device 137 operatively connected thereto and which includes a crank and lever means 138 whereby each revolution of the gear 128 will impart a single actuation to the counting device. The dial of the counting device is visible through an opening 139 in the top wall of the housing 10. By referring to the dial of the counter device, the authorities may know how many pictures have been taken and fed to the film box 30.

Switch means 142 (Figures 7 and 16) is provided for closing the circuit in which the motor 126 is arranged. The disk 130 has a projecting cam 141 on one face thereof which engages a switch 142 to momentarily close the motor circuit. This causes the starting latch-in relay for the motor 126 to be electrically reset thereby stopping it. The inertia of the system is adjusted to carry cam 141 beyond the contacts 140 of switch 142 thereby allowing them to be normally open and ready for the next cycle. Other means of accomplishing this purpose is not excluded however.

After the initial relay 154′ (Figure 16) in the system is tripped by a vehicle, it is essential that other vehicles subsequently passing in the same or opposite direction do not interfere with the correct recording of the vehicle which is in the process of being made. The protector means for accomplishing the aforesaid function include a motor driven device and a system of relays and contact switches best illustrated in Figures 4, 5 and 16 of the drawings. The protector means includes an electric motor 143 enclosed in the compartment 17 and supported upon the partition 15. The motor 143 is started and stopped through an electric circuit embodying a latch-in relay. The motor shaft 144 has a small pinion gear 145 fixed thereto which has constant meshing engagement with a larger gear 146 fixed to one end of a counter shaft 147 mounted in a bearing 148. The gear ratio and pitch diameters of the gears 145 and 146 are such that the time of revolution of gear 146 is between one and three seconds. The shaft 147 has four spaced apart cam wheels 149, 150, 151, and 152 respectively fixedly mounted thereon, which during rotation of the shaft 147 function to open and close electric switches 153, 154, 155, and 156 respectively. The switches 153 to 156 are mounted on a fixed support 157 and suitably insulated therefrom. Each of said switches includes a fixed contact element 158 and a flexible contact element 159, the latter having a pin 159′ in bearing engagement with the periphery of its related cam wheel. The high surfaces of the cam wheels act to open the switches and the low surfaces enable the resilient spring contact elements 159 to engage their respective mating elements 158. The switches 153, 155 and 156 are normally open while switch 154 is normally closed. The cam wheels are so positioned on the shaft 147 that during each revolution thereof, the switches are opened and closed in proper timed relation. When the motor 143 is on, the same drives the cam wheel shaft 147 through gears 145 and 146, and the cams thereon operate to successively actuate the switches to their open and closed positions.

The switch 153 is arranged in the electric reset of the latch-in relay 154′ controlling the motor 143 and as soon as contact is made, it shuts off the power to the motor.

The switch 154 is a part of the initial impulse circuit and normally closed, however, upon rotation of its cam 150 upon starting of the motor, the same opens to render the cable circuit inoperable until the cycle of operation is completed. At the end of the cycle, switches 153 and 156 are open while switch 154 is closed. The switch 156 completes part of the circuit in which the contacts 103—103 of the pick-up disk 81 are arranged.

Figure 1:
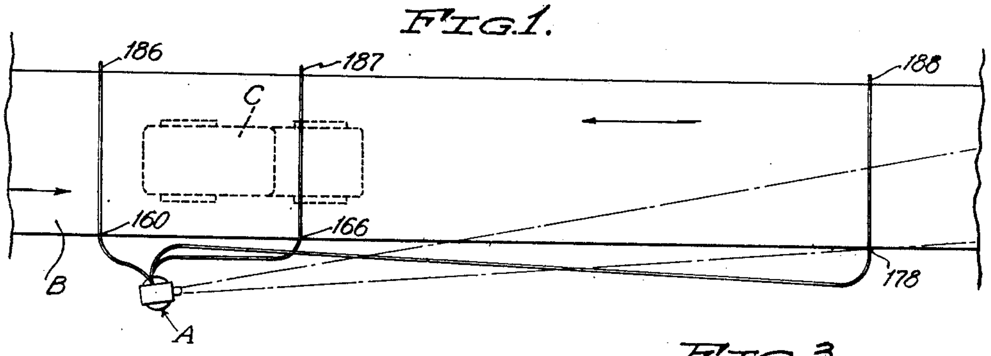
Figure 2:
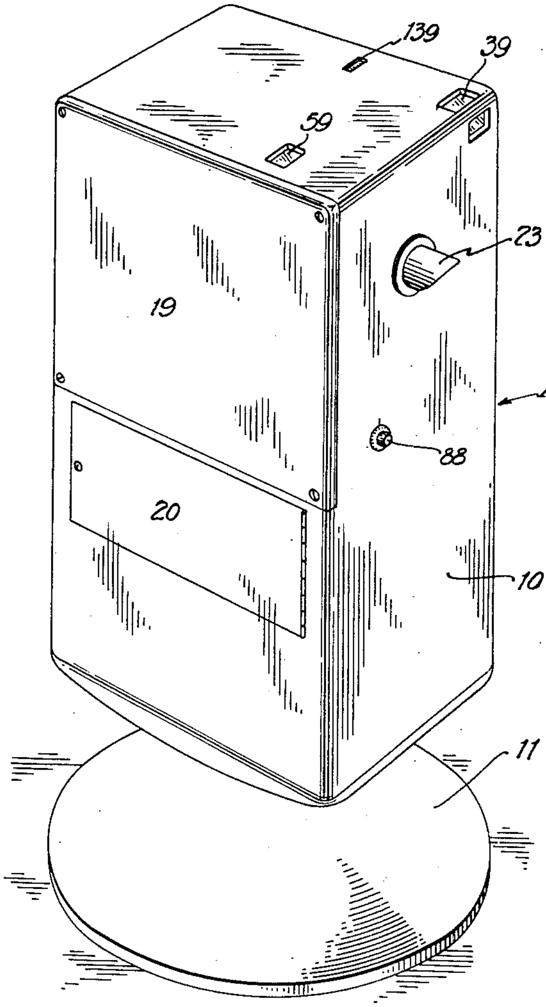
Figure 2 is a perspective view of the camera and timing unit per se.
Figure 3:
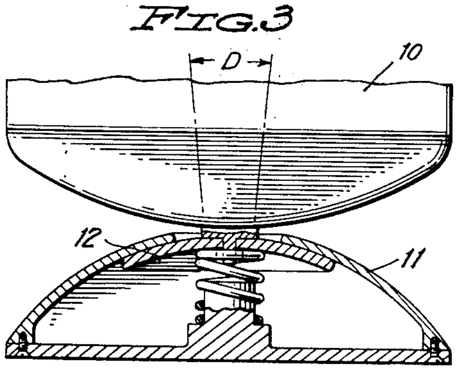
Figure 3 is a detail vertical sectional view through the base of the camera and timing unit.

When a vehicle or other moving body C (Figure 1) passes a certain fixed point, 160—186, Fig. 1, contact 160 is closed momentarily. This causes a flow of current in both primary coils 161 and 162 of the latch-in relays 154′ and 155′ respectively, thereby setting them and closing contacts 163 and 164 respectively. These relays are the common latch-in, electric reset relays with single contacts normally open, and with coil and contacts constructed for the type of current being used. Contact 163 closes the motor circuit M to motor 143, causing switch 154 to open and switch 156 to close. Switches 153 and 155 remain open for the time being. The initial closing of the switch 160 by an automobile causes the closing of the latch of relay 164 to maintain closed the timer circuit T which may be considered as connected at 165 to the constant speed motor 41 that turns the dial 44; this condition continues until the switch 166 is closed causing unlatching of the relay 164 by the reset coil 167 and stopping of the motor 41 and its dial. Because of the latching, a second impact on switch 160, as by the rear wheels of a car will have no effect, except perhaps in the case of a vehicle of such length that the rear wheels actuate switch 160 after the front wheels have actuated switch 165 for a resetting of the relays, but such a condition is guarded against in the following manner. Switch 154 is opened immediately after the initial impact on switch 160 so that a second impact thereon cannot cause operation of the relays 154′ or 155′ until such time as motor 143 has completed its cycle of operation as controlled by cam 149 and switch 153. When the vehicle passes the second fixed point it causes contact 166 to be closed momentarily. This energizes reset coil 167 thereby breaking the latch and contact 164 which in turn breaks the timer circuit T and stops the movement of dial 44. At the same time, since switch 156 is now closed, solenoid 98 is energized which causes dial 81 to rise and latch. This either completes or does not effect a bridging of contacts 103—103 depending on the relative positions of dial 44 and disk 81. If no contact is made through contacts 103—103 the following further circuits are made. Motor 143 continues to run until switch 155 is closed. This completes the circuit to the reset terminals 177 of the timer thereby returning dial 44 to zero. It also completes the circuit to reset coil 167 and unlatches the relay 155′ (if latched) to its original position thus preventing the reset circuit from operating against a positive movement of the dial 44. This also assures a reset condition of the relay 155′ in case contact 166 was not made, for example, by a vehicle contacting 160 and stopping before the contact 166 was reached. Continued movement of motor 143 opens switches 155 and 156 and closes switches 153 and 154. Closing of switch 153 energizes the reset coil 178′ which breaks contact 163 and cuts the power off the motor 143. At the same time reset solenoid 101 is energized and disk 81 allowed to drop back to the normal position. The inertia of the motor system is regulated such that after the power is cut from the motor 143, it continues to move forward far enough to release switch 153, but not so far as to open switch 154. Prior to closing of switch 154 it will be noted no circuit could be made through the timer. For example, if a vehicle tripped switch 160 to start the timer, then tripped switch 166 to stop it, no further tripping of 160 by say a following vehicle would have any effect on the timer or relays until the reset device operated by motor 143 had completed its cycle. This time would be sufficient to allow completion of all necessary picture taking, movement of film, etc.

The above case where contacts 103—103 were not bridged by contact member 105 would represent the passage by a vehicle at a speed below that for which the instrument was set and for which no picture was desired.

In the second case where contacts 103—103 are bridged by member 105, and where the three-way switch 173 is in the position shown by the heavy line in Figure 16, and numbered 174, then the circuit is ready to energize coil of the solenoid 120 of the shutter relay, just as soon as switch 178 is closed by the moving body. The energizing of solenoid 120 pulls down the solenoid plunger which operates the camera shutter 117, and closes switch 121 momentarily. This completes the circuit to lamp 51 through a transformer 182, if current conditions require it, causing the bulb to flash. At the same time such contact also energizes coil 179 of an electric reset latch-in relay 124 having one contact normally open and having a time delay action to prevent film movement before the camera shutter 117 can complete the operation. Contact 180 is made and held which completes the circuit to motor 125 causing the film 23 to move forward one picture area. On completion of the cycle, switch 140 is closed, which energizes reset coil 181 and breaks the circuit. Momentum of the motor system carries the moving cam 141 sufficiently past the contact arms 142 to allow them to break contact again so the system will be ready for the next cycle. In the meantime, motor 143 continues to rotate shaft 147 so that after the picture is taken the timer is reset, with both switches 163 and 164 opened and switch 154 closed ready for the next operation. If the distance between the first switch 160 and the switch 178 were forty-five feet, then a car going at the comparatively slow speed of fifteen miles per hour would just require slightly less than 2.05 seconds to traverse the distance. Allowing 0.45 second as a safety factor, a recycling time for shaft 147 of 2.50 seconds would permit consecutive records of speeds as low as fifteen miles per hour on cars separated by as little as twenty yards, and also on cars with speed up to eighty miles per hour when separated by as little as one hundred yards.

When the dial 44 is at zero setting, switch 109 will be open as previously described, which will prevent the picture-taking relays from operating in case of electrical or mechanical failure of the timer 40.

When the three-way switch 173 is moved to cover contact position 175, then every time switch 178 is closed a picture will be taken. When the switch is moved to cover contact position 176 and the timer contacts 103—103 are bridged by contact 107 of the dial 44 and disk 81 relationship, then, when switch 178 is closed, coil 183 is energized breaking switch 184 which is normally closed. This breaks the circuit before the slower moving solenoid 120 can act, thereby preventing a picture from being taken. When contacts 103—103 are not bridged by contact member 107, current does flow through switch 184 to energize coil of solenoid 120 and take a picture.

With the switch 173 at contact 174 and the machine set for thirty miles per hour, then all speeds of thirty miles per hour and above, within the working limits of the machine, will be registered. If the switch 173 is moved to contact 176, then only speeds below thirty miles per hour will be registered. With the switch contact at 175, all speeds will be registered and a picture taken every time a vehicle causes switch 178 to close. For various reasons, this may be convenient.

Although only one source of power is shown in the wiring circuit, it is not to be construed that combined sources may not be used. For example, I prefer a six volt direct current on the relay system, with timer starting and reset circuits operating off 110 volts A. C. This is easily accomplished by one skilled in the art and requires no further explanation. Other combinations may suggest themselves to suit various sources of supply and conditions. If a standard millisecond timer is used and/or an electric clock, a continuous source of power to it or them would be necessary. This is not shown in the drawings as it requires no special wiring considerations.

To summarize, with switch 173 set at contact 174, switches 160, 166 and 178 would be consecutively operated by a vehicle traveling in a corresponding direction at or above the minimum speed setting of the machine would cause the recording operation thereof. A vehicle traveling in a reverse direction would not cause such operation of the machine and would not interfere with the automatic resetting thereof.

Figure 1 shows the general plan for setting up the instrument along a roadside. The device A is located a convenient and safe distance of say six to twelve feet from the edge of the road section B. Three relay stations 186—160, 187—166 and 188—178 spaced at a definite distance apart are laid directly across the road B. The first two stations may possibly be from ten to twenty feet apart, while the third may be about thirty-five feet past the second. The distance between the first two is critical and dependent on the calibration of the instrument being used. The relays may be of the usual cable, photo-electric or other similar type whose final result is to close the electric switches 160, 166 and 178. The active part of the relay on a two-way highway should extend not further than about three-quarters of the way over the first lane. The balance of the cable or other visible equipment of like nature should be a dummy. As a vehicle passes from left to right along the highway or other path, switches 160 and 166 measure the speed by timing the interval, while switch 178 operates the camera in a manner illustrated and discussed above. Doubtless other uses and means of practical applications will be manifest from the above description.

A vehicle exceeding the speed limit for which the apparatus A is set will be photographed upon the film 23 together with the speed in miles per hour, the time of day and the identification number of the recording apparatus. In Figure 15, I have illustrated a developed film strip 190 containing the image of the rear of an automobile 191 which bears the license plate, the miles per hour speed 192, the time of day 193 and the identification number 194 of the apparatus which photographs the speeding automobile. Such evidence in a court of law will enable the arresting authorities to convict violators of speed laws.

It will be obvious in reading my description that many minor changes in size, form and construction of the parts of my speed trap may be made and substituted for those herein shown, without departing from the spirit of my invention, the scope of which is set forth in the appended claims.

Having thus described my invention, what I claim as new and desire to secure by Letters Patent, is:

1. Speed recording apparatus comprising terminals to be closed by a passing vehicle, a circuit connected to said terminals and having other terminals therein, a movable speedometer member having a contact to unite said other terminals, a motor to actuate said member, a relay in said circuit, a second motor to be connected into said circuit by said relay, a second relay in said circuit to connect said first-named motor and actuate said member to bridge said other terminals with said contact, additional terminals spaced from the first-named terminal to be closed by said vehicle after said first-named terminals, means in said circuit controlled by said additional terminals to interrupt the operation of said first-named motor and stop said member, a switch in said circuit operated by said second-named motor and connected to said second relay to be opened after the first-named motor is interrupted, a third set of terminals to be closed by said vehicle beyond said first and said additional terminals, said apparatus also comprising a camera focussed upon said member and having a shutter, and a lamp element and means in said circuit for operating said shutter and energizing said lamp when the third set of terminals are engaged by said vehicle a predetermined time interval after the closing of the first-named terminals, said apparatus also having means for adjusting said other terminals to be engaged by said contact.

2. Speed recording apparatus comprising terminals to be closed by a passing vehicle, a circuit connected to said terminals and having other terminals therein, a movable speedometer member having a contact to unite said other terminals, a motor to actuate said member, a relay in said circuit, a second motor to be connected into said circuit by said relay, a second relay in said circuit to connect said first-named motor and actuate said member to bridge said other terminals with said contact, additional terminals spaced from the first-named terminals to be closed by said vehicle after said first-named terminals, means in said circuit controlled by said additional terminals to interrupt the operation of said first-named motor and stop said member, a switch in said circuit operated by said second-named motor, and connected to said second relay to be opened after the first-named motor is interrupted, a third set of terminals to be closed by said vehicle beyond said first and said additional terminals, said apparatus also comprising a camera focussed upon said member and having a shutter, and a lamp element and means in said circuit for operating said shutter and energizing said lamp when the third set of terminals are engaged by said vehicle a predetermined time interval after the closing of the first-named terminals, said apparatus also having a film movably mounted adjacent said member, and means for transmitting light from said lamp to said film, a motor to move said film after said lamp is energized, and a switch for the last-named motor actuated by the second-named motor to disconnect the motor for moving said film.

3. Speed recording apparatus comprising terminals to be closed by a passing vehicle, a circuit connected to said terminals and having other terminals therein, a movable speedometer member having a contact to unite said other terminals, a motor to actuate said member, a relay in said circuit, a second motor to be connected into said circuit by said relay, a second relay in said circuit to connect said first-named motor and actuate said member to bridge said other terminals with said contact, additional terminals spaced from the first-named terminals to be closed by said vehicle after said first-named terminals, means in said circuit controlled by said additional terminals to interrupt the operation of said first-named motor and stop said member, a switch in said circuit operated by said second-named motor, and connected to said second relay to be opened after the first-named motor is interrupted, a third set of terminals to be closed by said vehicle beyond said first and said additional terminals, said apparatus also comprising a camera focussed upon said member and having a shutter, and a lamp element and means in said circuit for operating said shutter and energizing said lamp when the third set of terminals are engaged by said vehicle a predetermined time interval after the closing of the first-named terminals, said apparatus also having a movable support for said other terminals, and parts for actuating said support to carry said other terminals into position to be engaged by said contact, said circuit containing means including a solenoid, a third relay, and another switch controlled by said second-named motor to operate said parts.

4. Speed recording apparatus comprising terminals to be closed by a passing vehicle, a circuit connected to said terminals and having other terminals therein, a movable speedometer member having a contact to unite said other terminals, a motor to actuate said member, a relay in said circuit, a second motor to be connected into said circuit by said relay, a second relay in said circuit to connect said first-named motor and actuate said member to bridge said other terminals with said contact, additional terminals spaced from the first-named terminals to be closed by said vehicle after said first-named terminals, means in said circuit controlled by said additional terminals to interrupt the operation of said first-named motor and stop said member, a switch in said circuit operated by said second-named motor, and connected to said second relay to be opened after the first-named motor is interrupted, a third set of terminals to be closed by said vehicle beyond said first and said additional terminals, said apparatus also comprising a camera focussed upon said member and having a shutter, and a lamp element and means in said circuit for operating said shutter and energizing said lamp when the third set of terminals are engaged by said vehicle a predetermined time interval after the closing of the first-named terminals, said circuit also having a controlling switch and means in circuit for preventing operation of the shutter of said camera.

5. Speed recording apparatus comprising terminals to be closed by a passing vehicle, a circuit connected to said terminals and having other terminals therein, a movable speedometer member having a contact to unite said other terminals, a motor to actuate said member, a relay in said circuit, a second motor to be connected into said circuit by said relay, a second relay in said circuit to connect said first-named motor and actuate said member to bridge said other terminals with said contact, additional terminals spaced from the first-named terminals to be closed by said vehicle after said first-named terminals, means in said circuit controlled by said additional terminals to interrupt the operation of said first-named motor and stop said member, a switch in said circuit operated by said second-named motor, and connected to said second relay to be opened after the first-named motor is interrupted, a third set of terminals to be closed by said vehicle beyond said first and said additional terminals, said apparatus also comprising a camera focussed upon said member and having a shutter, and a lamp element and means in said circuit for operating said shutter and energizing said lamp when the third set of terminals are engaged by said vehicle a predetermined time interval after the closing of the first-named terminals, said apparatus having a movable support for said other terminals, and parts for actuating said support to carry said other terminals into position to be engaged by said contact, said circuit further containing means including a solenoid, a third relay, and another switch controlled by said second named motor to operate said parts, said circuit also containing a third switch operated by the second-named motor, and a coil in circuit therewith to reverse the action of the third relay and solenoid and release said parts.

6. Speed recording apparatus comprising terminals to be closed by a passing vehicle, a circuit connected to said terminals and having other terminals therein, a movable speedometer member having a contact to unite said other terminals, a motor to actuate said member, a relay in said circuit, a second motor to be connected into said circuit by said relay, a second relay in said circuit to connect said first-named motor and actuate said member to bridge said other terminals with said contact, additional terminals spaced from the first-named terminals to be closed by said vehicle after said first-named terminals, means in said circuit controlled by said additional terminals to interrupt the operation of said first-named motor and stop said member, a switch in said circuit operated by said second-named motor, and connected to said second relay to be opened after the first-named motor is interrupted, a third set of terminals to be closed by said vehicle beyond said first and said additional terminals, said apparatus also comprising a camera focussed upon said member and having a shutter, and a lamp element and means in said circuit for operating said shutter and energizing said lamp when the third set of terminals are engaged by said vehicle a predetermined time interval after the closing of the first-named terminals.

7. Recording apparatus comprising in combination contact parts at a point in the path of a moving body, additional contact parts in said path at another point, a movable speedometer member, a switch contact thereon, an element adjacent said member and bearing complementary terminals, means for supporting said element to be bodily movable adjacent said member, a motor connected to said member, and means including electric supply circuits containing said parts in said path and controlling devices therein for energizing the motor and shifting the said element to carry said terminals into position to be engaged by the switch contact when said body moves said parts at both points successively to closed circuit position in a predetermined interval of time.

8. Recording apparatus comprising in combination contact parts at a point in the path of a movable body, additional contact parts in said path at another point, a movable speedometer member, an element adjacent said member and bearing complementary terminals, means for suporting said element to be bodily movable adjacent said member, a motor connected to said member, and means comprising electric circuits containing said parts in said path and controlling devices therein for energizing the motor and shifting the said element to carry said terminals into position to be engaged by said switch contact when said body moves said parts at both points sucessively to closed circuit position in a predetermined interval of time, said apparatus also having gear connections for adjusting the position of said element.

9. Recording apparatus comprising in combination contact parts at a point in the path of a moving body, additional contact parts in said path at another point, a movable speedometer member, a switch contact thereon, an element adjacent said member and bearing complementary terminals, means for supporting said element to be bodily movable adjacent said member, a motor connected to said member and means including electric supply circuit containing said parts in said path and controlling devices therein for energizing the motor and shifting said element to carry said terminals into position to be engaged by switch contact, when said body moves said parts at both points successively to closed circuit position in a predetermined interval of time, said devices including solenoids to actuate said elements to shift same.

10. Recording apparatus comprising in combination contact parts at a point in the path of a moving body, additional contact parts in said path at another point, a movable speedometer member, a switch contact thereon, an element adjacent said member and bearing complementary terminals, means for supporting said element to be bodily movable adjacent said member, a motor connected to said member, means including electric supply circuits containing said parts in said path and controlling devices therein for energizing the motor and shifting the said element to carry said terminal into position to be engaged by said switch contact, when said body moves said parts at both points successively to closed-circuit position in a predetermined interval of time, said apparatus also having a lamp to illuminate a portion of said member, a photographic camera bearing a shutter, a light sensitive film associated with said camera, means in said circuits to energize said lamp and operate said shutter when said terminals are engaged by the switch contact, and switches for said last-named means in said circuits together with optical transmitting means to direct and focus the light from said lamp upon both said film and said speedometer member.

11. Recording apparatus comprising in combination contact parts at a point in the path of a moving body, additional contact parts in said path at another point, a movable speedometer member, a switch contact thereon, an element adjacent said member and bearing complementary terminals, means for supporting said element to be bodily movable, adjacent said member, a motor connected to said member, means including electric supply circuits containing said parts in said path and controlling devices therein for energizing the motor and shifting the said element to carry said terminals into position to be engaged by said switch when said body moves said parts at both points successively into closed-circuit position in a predetermined interval of time, said apparatus also having a lamp to illuminate a portion of said member, a photographic camera bearing a shutter, a light sensitive film associated with said camera, means in said circuits to energize said lamp and operate said shutter when said terminals are engaged by the switch, contact switches for said last-named means in said circuits together with optical transmitting means to direct and focus the light from said lamp upon both said film and said speedometer member, a second motor and additional device in said circuits for intermittently actuating said film after exposure by said shutter, and a time indicating device also in proximity to said lamp.

12. Recording apparatus comprising in combination contact parts at a point in the path of a moving body, additional contact parts in said path at another point, a movable speedometer member, a switch contact thereon, an element adjacent said member, and bearing complementary terminals, means for supporting said element to be bodily movable adjacent said member, a motor connected to said member, means including electric supply circuits containing said parts in said path and controlling devices therein for energizing the motor and shifting the said element to carry said terminals into position to be engaged by said switch contact when said body moves said parts at both points successively into closed circuit position, in a predetermined interval of time, said apparatus also having a lamp to illuminate a portion of said member, a photographic camera bearing a shutter, a light sensitive film associated with said camera, means in said circuits to energize said lamp and operate said shutter when said terminals are engaged by the switch contact, switches for said last-named means in said circuits together with optical transmitting means to direct and focus the light from said lamp upon both said film and said speedometer member, and tubular casings containing said devices and said lamp adjacent said shutter and said member.

13. Recording apparatus comprising a movable speedometer member bearing indications, a switch contact mounted on said member and movable therewith, an element adjacent said member and bearing at least one terminal to cooperate with said contact, actuating connections for shifting said element bodily towards said member to bring said terminal into line with said contact, a motor for operating said member, and means including electric circuits and controlling devices therein for energizing the motor and shifting said element to carry said terminal into position to be engaged by the switch contact.

14. Recording apparatus comprising a speedometer member having indications thereon, a shaft on which said member is mounted, to be rotated by the shaft, a switch contact on said member, an element adjacent said member, means for supporting said element adjacent said member to be shiftable in the direction of the shaft's extent towards and from said member, at least one terminal on said element, a motor for operating said member, and means including electric circuits and controlling devices for energizing the motor to turn said shaft and shift the element to carry the terminal into position to be engaged by said contact, optical transmitting means to direct light upon said indications and a camera to receive said light.

15. The method of recording the speed of a moving vehicle, the vehicle itself, and the time of passage of said vehicle, which consists in exerting a force at one point and one instant in the travel of said vehicle to move into a selected position, an indication of the speed of the vehicle and except at a predetermined speed of the vehicle, substantially immediately to shift said indication away from said position, and at another point and a subsequent instant, exerting another force when the speed of the vehicle has a predetermined value, to hold said indication momentarily, then generating a beam of light, directing said beam upon said indication in said position, making and recording an image of said indication in the path of said beam, and simultaneously photographing the vehicle and time of passage adjacent the image of said indication.

JOHN W. McCUTCHEON.

REFERENCES CITED

The following references are of record in the file of this patent:

UNITED STATES PATENTS

| Number | Name | Date |
|---|---|---|
| 1,368,798 | Henry | Feb. 15, 1921 |
| 1,779,853 | Paulus et al. | Oct. 28, 1930 |
| 2,091,357 | Goldsmith | Aug. 31, 1937 |
| 2,250,442 | Abell | July 29, 1941 |
| 2,336,076 | Durham et al. | Dec. 7, 1943 |
| 2,336,081 | Finnegan et al. | Dec. 7, 1943 |
| 2,347,194 | Holliday | Apr. 25, 1944 |